(12) United States Patent
Kiliccote

(10) Patent No.: US 8,534,567 B2
(45) Date of Patent: Sep. 17, 2013

(54) METHOD AND SYSTEM FOR CREATING AND USING BARCODES

(71) Applicant: Han Kiliccote, Orinda, CA (US)

(72) Inventor: Han Kiliccote, Orinda, CA (US)

(73) Assignee: Overtouch Remote L.L.C., Dover, DE (US)

( * ) Notice: Subject to any disclaimer, the term of this patent is extended or adjusted under 35 U.S.C. 154(b) by 0 days.

(21) Appl. No.: 13/735,453

(22) Filed: Jan. 7, 2013

(65) Prior Publication Data

US 2013/0119139 A1    May 16, 2013

Related U.S. Application Data

(63) Continuation of application No. 13/456,947, filed on Apr. 26, 2012, now Pat. No. 8,376,240, which is a continuation of application No. 12/539,552, filed on Aug. 11, 2009, now Pat. No. 8,215,564, which is a continuation of application No. 11/612,447, filed on Dec. 18, 2006, now Pat. No. 7,571,864.

(60) Provisional application No. 60/751,035, filed on Dec. 16, 2005.

(51) Int. Cl.
*G06K 19/06* (2006.01)

(52) U.S. Cl.
USPC ................. 235/494; 235/462.01; 235/462.08; 235/462.09

(58) Field of Classification Search
USPC ................... 235/462.01, 462.08, 462.09, 494
See application file for complete search history.

(56) References Cited

U.S. PATENT DOCUMENTS

| | | | |
|---|---|---|---|
| 4,720,860 A | 1/1988 | Weiss | |
| 4,885,778 A | 12/1989 | Weiss | |
| 5,189,292 A | 2/1993 | Batterman et al. | |
| 5,221,838 A | 6/1993 | Gutman et al. | |
| 5,317,636 A | 5/1994 | Vizcaino | |
| 5,606,609 A | 2/1997 | Houser | |
| 5,635,906 A | 6/1997 | Joseph | |
| 5,670,771 A | 9/1997 | Watanabe et al. | |
| 5,773,806 A | 6/1998 | Longacre | |
| 5,862,270 A | 1/1999 | Lopresti et al. | |
| 5,873,735 A | 2/1999 | Yamada | |
| 6,016,476 A | 1/2000 | Maes et al. | |
| 6,279,830 B1 | 8/2001 | Ishibashi | |
| 6,446,869 B1 | 9/2002 | Seevers et al. | |
| 6,512,919 B2 | 1/2003 | Ogasawara | |

(Continued)

OTHER PUBLICATIONS

International Search Report mailed Jan. 3, 2007 for PCT Application No. PCT/US2006/05881, 4 pages.

(Continued)

*Primary Examiner* — Tuyen K Vo
(74) *Attorney, Agent, or Firm* — Turocy & Watson, LLP

(57) ABSTRACT

Methods for efficiently retrieving information from an image of a symbol are described. Symbols are described that contain detection patterns that facilitate the determination of location, alignment, size and orientation of the symbol in an image. Detection patterns are described that possess geometric shapes susceptible to efficient decoding using probabilistic detection algorithms. Detection patterns are described that are provided in colors, shapes and sizes different from the color, shape and sizes of modules carrying information in the symbol. Methods are described for identifying the location and size of detection patterns in images of the symbol and for locating modules in the symbol to facilitate extraction of information carried by the modules.

20 Claims, 22 Drawing Sheets

(56) References Cited

U.S. PATENT DOCUMENTS

| | | |
|---|---|---|
| 6,685,095 B2 | 2/2004 | Roustaei et al. |
| 6,742,708 B2 | 6/2004 | Shaked et al. |
| 6,757,826 B1 | 6/2004 | Paltenghe |
| 6,863,218 B2 | 3/2005 | Muramatsu |
| 6,937,989 B2 | 8/2005 | McIntyre et al. |
| 6,950,800 B1 | 9/2005 | McIntyre et al. |
| 6,988,199 B2 | 1/2006 | Toh et al. |
| 7,021,534 B1 | 4/2006 | Kiliccote et al. |
| 7,114,656 B1 | 10/2006 | Garver |
| 7,207,481 B2 | 4/2007 | Barenburg et al. |
| 7,266,693 B1 | 9/2007 | Potter et al. |
| 7,379,921 B1 | 5/2008 | Kiliccote |
| 7,380,708 B1 | 6/2008 | Kiliccote |
| 2001/0013550 A1 | 8/2001 | Watanabe et al. |
| 2001/0025886 A1 | 10/2001 | He et al. |
| 2001/0045461 A1 | 11/2001 | Scbuessler |
| 2002/0020747 A1 | 2/2002 | Wakamiya et al. |
| 2002/0023215 A1 | 2/2002 | Wang et al. |
| 2002/0041712 A1 | 4/2002 | Roustaei et al. |
| 2002/0079370 A1 | 6/2002 | Wood et al. |
| 2002/0145038 A1 | 10/2002 | O'Hagan et al. |
| 2003/0014315 A1 | 1/2003 | Jaalinoja et al. |
| 2003/0080191 A1 | 5/2003 | Lubow et al. |
| 2003/0161475 A1 | 8/2003 | Crumly et al. |
| 2004/0020989 A1 | 2/2004 | Muramatsu |
| 2004/0026508 A1 | 2/2004 | Nakajima et al. |
| 2004/0026510 A1 | 2/2004 | Cheung et al. |
| 2004/0035935 A1 | 2/2004 | Takahashi et al. |
| 2004/0046025 A1 | 3/2004 | Lebaschi et al. |
| 2004/0064704 A1 | 4/2004 | Rahman |
| 2004/0089727 A1 | 5/2004 | Baharav et al. |
| 2004/0199427 A1 | 10/2004 | Van der Loo |
| 2004/0267663 A1 | 12/2004 | Karns et al. |
| 2005/0029354 A1 | 2/2005 | Frantz et al. |
| 2005/0061892 A1* | 3/2005 | Lapstun et al. ............ 235/494 |
| 2005/0109846 A1 | 5/2005 | Lubow |
| 2005/0199721 A1 | 9/2005 | Chang et al. |
| 2005/0213458 A1* | 9/2005 | Iwase ............ 369/53.35 |
| 2005/0274804 A1 | 12/2005 | Matsumoto |
| 2006/0045164 A1 | 3/2006 | Schuh et al. |
| 2006/0054695 A1 | 3/2006 | Owada |
| 2006/0118631 A1 | 6/2006 | Lubow et al. |
| 2006/0157574 A1 | 7/2006 | Farrar et al. |
| 2006/0196950 A1 | 9/2006 | Kiliccote |
| 2006/0269136 A1 | 11/2006 | Squires et al. |
| 2007/0114285 A1 | 5/2007 | Chang et al. |
| 2007/0152060 A1 | 7/2007 | Kiliccote |
| 2011/0284644 A1 | 11/2011 | Walmsley et al. |

OTHER PUBLICATIONS

Search Report issued in corresponding PCT Application No. PCT/US2006/48485 dated Nov. 20, 2007, 2 pages.

Office Action dated Jul. 5, 2012 for U.S. Appl. No. 13/456,947, 17 pages.

* cited by examiner

METHOD AND SYSTEM FOR CREATING AND USING BARCODES

CROSS-REFERENCE TO RELATED APPLICATIONS

This application is a continuation of U.S. patent application Ser. No. 13/456,947, filed Apr. 26, 2012, and entitled "Method and System for Creating and Using Barcodes," which is a continuation of U.S. patent application Ser. No. 12/539,552, filed Aug. 11, 2009, entitled "Method and System for Creating and Using Barcodes" and issued as U.S. Pat. No. 8,215,564 on Jul. 10, 2012, which is a continuation of U.S. patent application Ser. No. 11/612,447, filed Dec. 18, 2006, entitled "Method and System for Creating and Using Barcodes," and issued as U.S. Pat. No. 7,571,864. This application also claims priority from U.S. Provisional Patent Appln. No. 60/751,035, filed Dec. 16, 2005, and entitled "Method and System for Creating and Using Barcodes." This application is also related to U.S. patent application Ser. No. 11/357,369, filed Feb. 16, 2006, entitled "Method of Transferring Data through Moving Images," and issued as U.S. Pat. No. 7,543,748. These patent applications are each incorporated herein by reference in their entireties.

BACKGROUND OF THE INVENTION

1. Field of the Invention

The present invention generally relates to barcodes. More particularly, the present invention relates to methods and systems for creating barcodes where finder position detection and alignment patterns include certain geometric shapes that facilitate detection and decoding.

2. Description of Related Art

Typically, barcodes are machine-readable representation of information displayed in a visual format on a surface. There are different types of barcodes. Linear barcodes store data in the widths and spacing of printed parallel lines. Stacked barcodes and 2-dimensional (2D) barcodes, which represent stored data in patterns of dots, concentric circles and hidden images, have a higher data storage capacity than linear barcodes. Barcodes may be read by optical scanners called barcode readers and/or scanned from an image by special software.

To increase the amount of information that can be stored in a given space, linear requirements of simple barcodes have been extended with matrix codes. Matrix codes are a type of 2D barcode. Matrix codes are made of a grid of square cells called modules. Stacked barcodes are similar to 2D barcodes. Stacked barcodes are formed by taking a traditional linear barcode and placing it in an envelope that allows multiple rows of linear barcodes. FIG. 1 illustrates an example of a matrix barcode called QRCode[1] typically used in the art today.

[1] QRCode is trademark of Denso-Wave, Inc.

The mapping between data and the barcode that embeds the data is called a symbology. Symbologies include specifications relating to various parameters, such as, the encoding of the data, the start and stop markers into bars or dots and spaces, the size of the quiet zone required to be before and after the barcode. Symbologies also include a specification for forward error correction used in the barcode.

Linear and 2D barcode symbologies may use horizontal and vertical timing patterns to facilitate decoding of the barcode. The timing patterns usually include a one-module wide row or column of alternating dark and light modules, commencing and ending with a dark module. Linear and 2D barcode symbologies may use position detection patterns that enable the symbol density and version to be determined and may provide datum positions for determining module coordinates.

Existing symbologies encode symbols in a linear or 2D image. More specifically, such symbologies use black and white bars or dots that overall define the barcode image, When decoding a linear or 2D code example, various confusing cases may arise. For example, in one case, consecutive long sequences of whites (or blacks) may render it hard to determine the number of consecutive whites and blacks due to camera distortion and camera viewing angle. FIG. 2 illustrates a typical difference between module sizes due to certain perspective distortions, such as parallax.

In another example, the typical barcode may utilize various patterns to determine the orientation and location of the image. These patterns might repeat themselves in the data. Such repetition might render decoding the barcode a difficult, if not impossible task.

In a further example, due to the large possible orientations of the camera relative to the barcode, each symbol may take on a different size and/or shape relative to the scanner image. The symbologies may assign a timing pattern in the image and try to resolve the location of each symbol through the timing and location patterns. At large or highly skewed viewing angles, this approach might not work, because the symbols may scale up to distorted and different-sized shapes at the final image that are unrecognizable (i.e., un-decodable) to the scanner software.

In barcode symbologies, alignment patterns are typically used to correct errors in the estimates. Certain image distortions, such as perspective distortions, defects in the lenses of the camera, defects on the surfaces or natural curvatures of certain displays such as CRT monitors, may cause very large distortions. If the error caused by distortion causes the decoder to lose where the alignment pattern is, either the alignment pattern must be searched around where the estimated position, which may cause significant performance problems or it would render the barcode undecipherable.

Hence, it would be desirable to provide a method and system that is capable of creating barcodes that facilitate decoding in a manner that solves one or more of the problems with the typical barcodes of today.

SUMMARY

Certain embodiments of the invention provide a matrix symbology and methods for encoding and decoding symbols encoded according to the matrix symbology. In certain embodiments, a symbol is encoded or decoded as an array of modules carrying information and arranged in an overall geometric pattern, or barcode symbol. According to certain aspects of the invention, a plurality of additional patterns is encoded in the symbol to assist decoding of images of the symbol. The additional patterns provide information that facilitates the correction of images of the symbol that are misaligned, disoriented or distorted. According to certain aspects of the invention, these additional patterns can be provided in colors, shapes and sizes different from the modules such that the additional patterns are more easily distinguished from the modules and to improve efficiency of detection of the additional patterns.

In certain embodiments, a symbol may include a finder pattern located in relation to or centered on a specific point in the pattern such as the center or corners of the symbol. The symbol can include position detection patterns, orientation patterns and location detection patterns that allow a decoding algorithm to further verify existence of the symbol and detect the orientation, alignment and position of the symbol and components of the symbol in relation to one another.

Certain embodiments provide methods for decoding symbols provided according to aspects of the invention. In certain embodiments of the invention, symbol decoding speed can be increased through the use of geometric shapes for position detection patterns, orientation patterns and location detection patterns. Methods of efficiently detecting such geometric shapes are described in which probabilistic detection algorithms operate to determine whether a starting point is located inside a specific geometric shape.

BRIEF DESCRIPTION OF THE DRAWINGS

Aspects and features of the present invention will become apparent to those ordinarily skilled in the art from the following detailed description of embodiments of the invention in conjunction with the accompanying drawings, wherein.

Color

Color

Color

Color

Color

Color

Color

Color

Color

[2] Data Matrix is a trademark of International Data Matrix, Inc.

Figure 21:
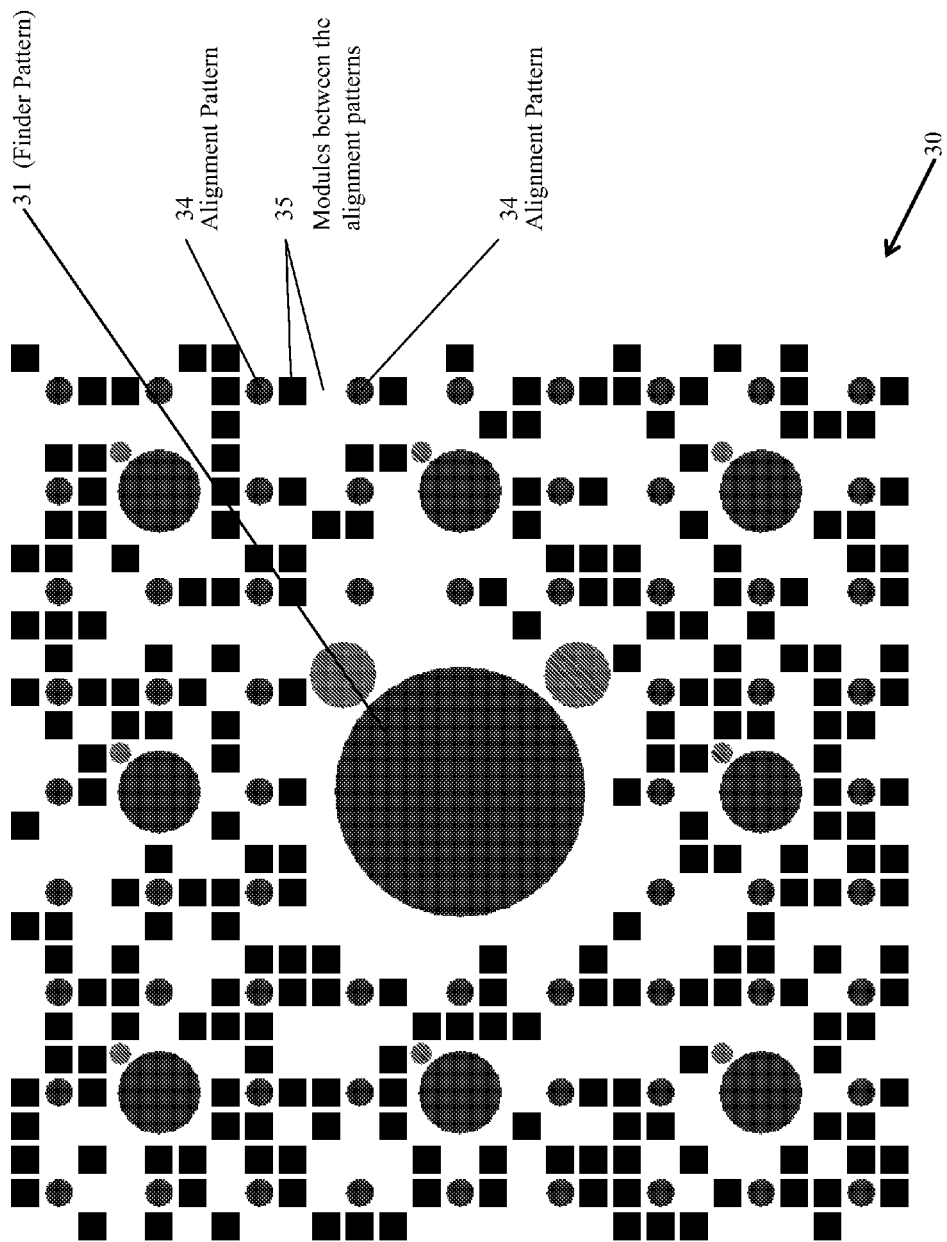
Figure 22:
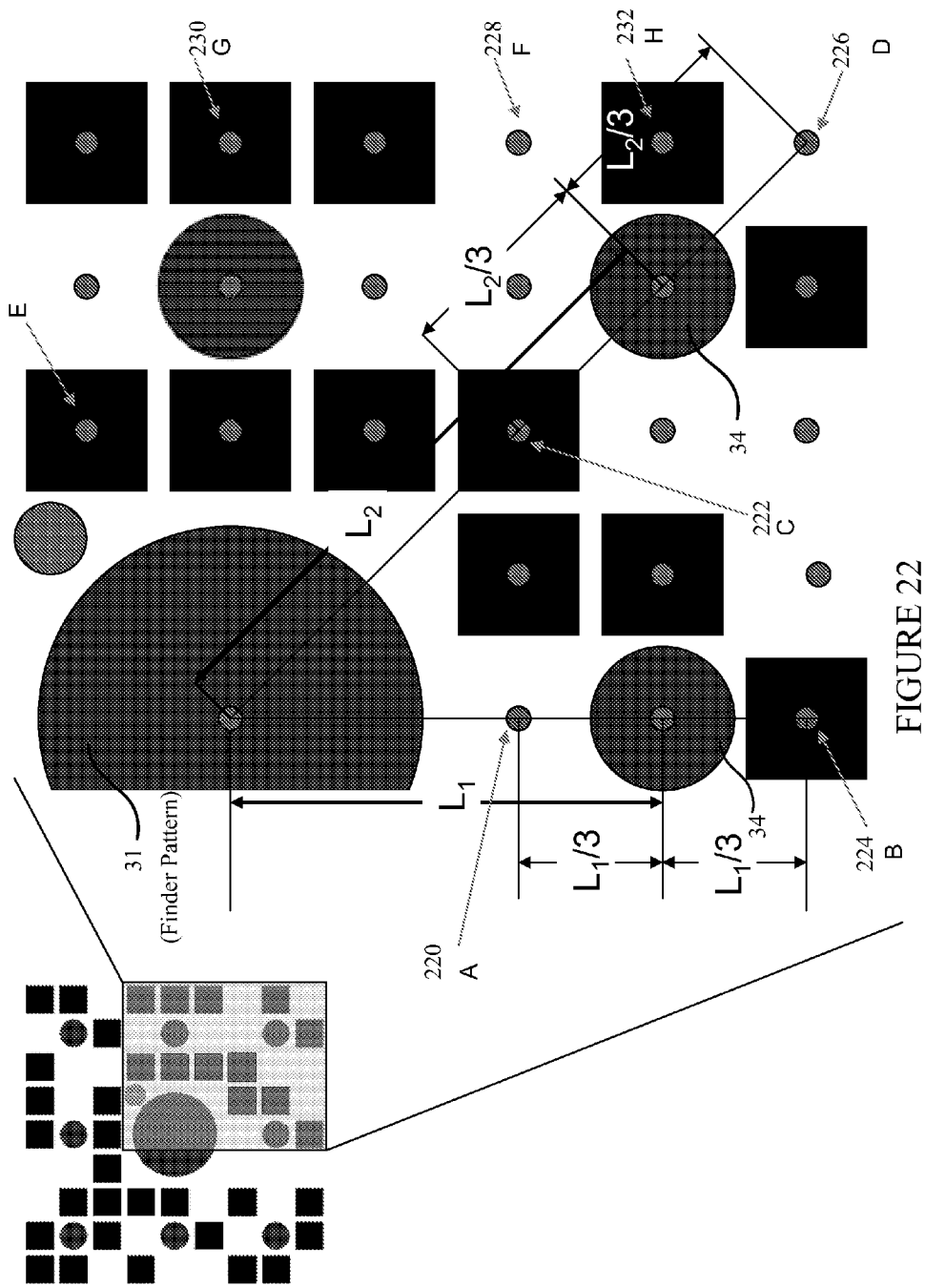

Color FIG. 21 illustrates how two alignment patterns can be used to derive the position of the modules according to certain embodiments of the present invention; and Color FIG. 22 illustrates an exemplary geometric calculation of how module location can be derived according to certain embodiments of the present invention.

DETAILED DESCRIPTION OF THE INVENTION

The present invention will now be described in detail with reference to the drawings, which are provided as illustrative examples of the invention so as to enable those skilled in the art to practice the invention. Notably, the figures and examples below are not meant to limit the scope of the present invention. Where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the components referred to herein by way of illustration.

In certain embodiments, a matrix symbology includes an array of modules arranged in an overall geometric pattern, or barcode symbol, such as a rectangle. According to certain aspects of the invention, a plurality of additional patterns may be encoded in the symbol to assist decoding of images of the symbol, including images that are misaligned or distorted. According to certain aspects of the invention, these additional patterns can be provided in colors, shapes and sizes different from the modules such that the additional patterns are more easily distinguished from the modules and to improve efficiency of detection of the additional patterns.

Figure 1:
FIG. 1 illustrates an example of a stacked barcode called QRCode typically used in the art today.
Figure 2:
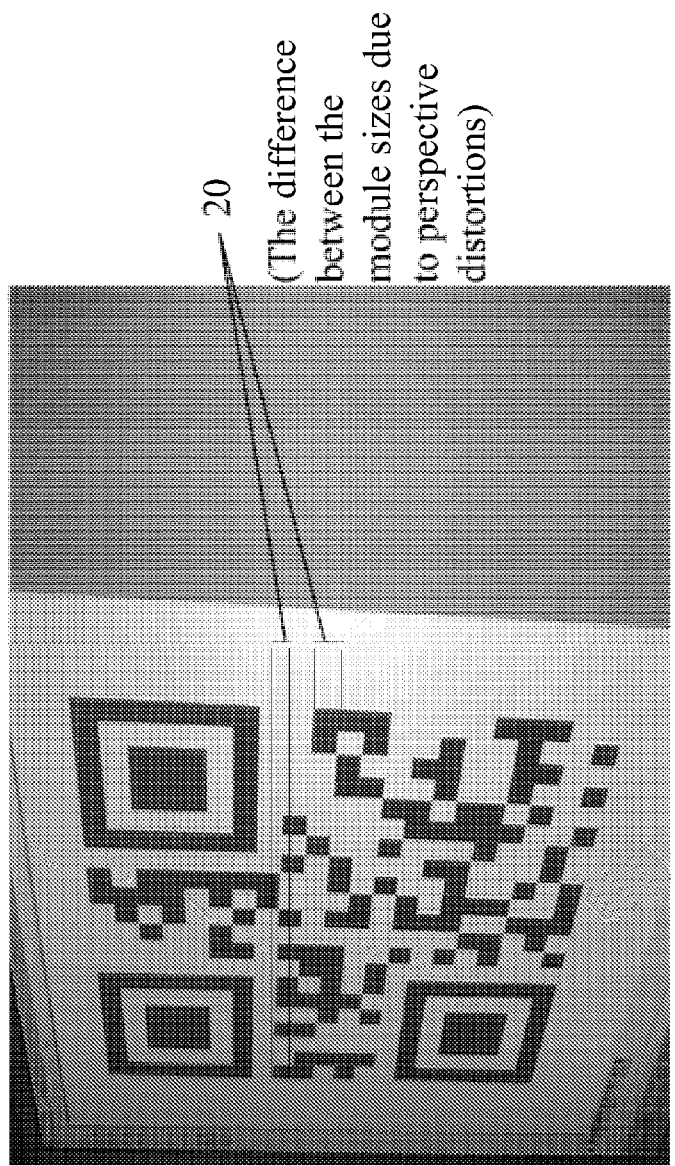
FIG. 2 illustrates a typical difference between module sizes due to certain perspective distortions, such as parallax.
Figure 3:
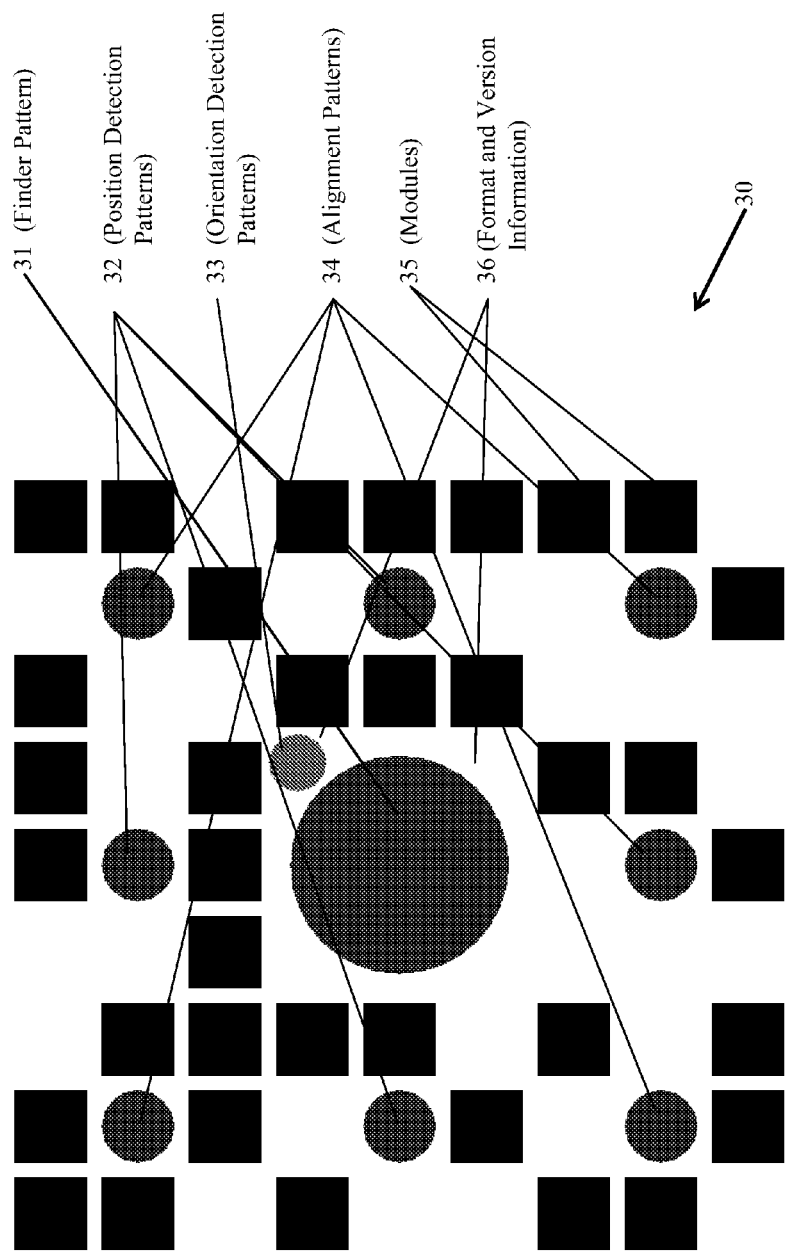
FIGS. 3-5 illustrate a schematic diagrams showing a color coded image generated according to certain embodiments of the present invention.
Figure 4:
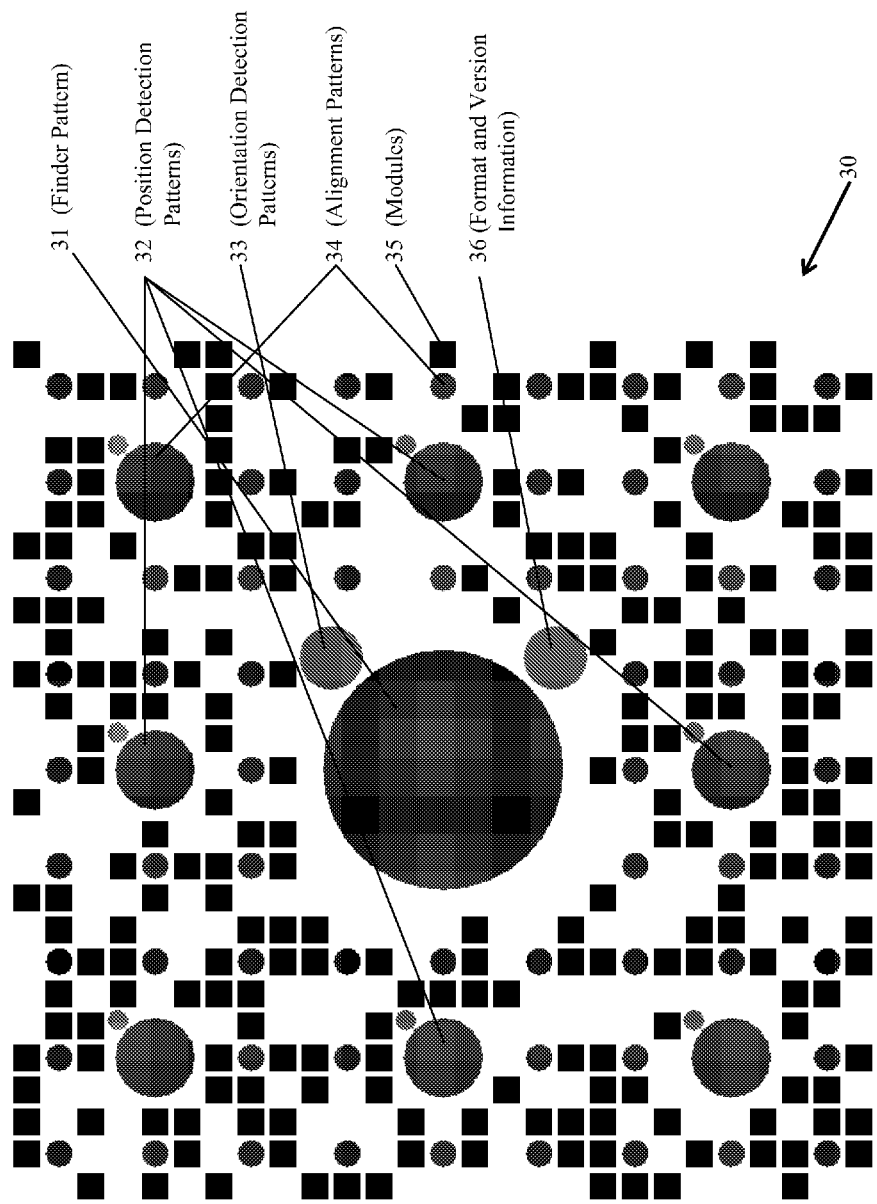
Figure 5:
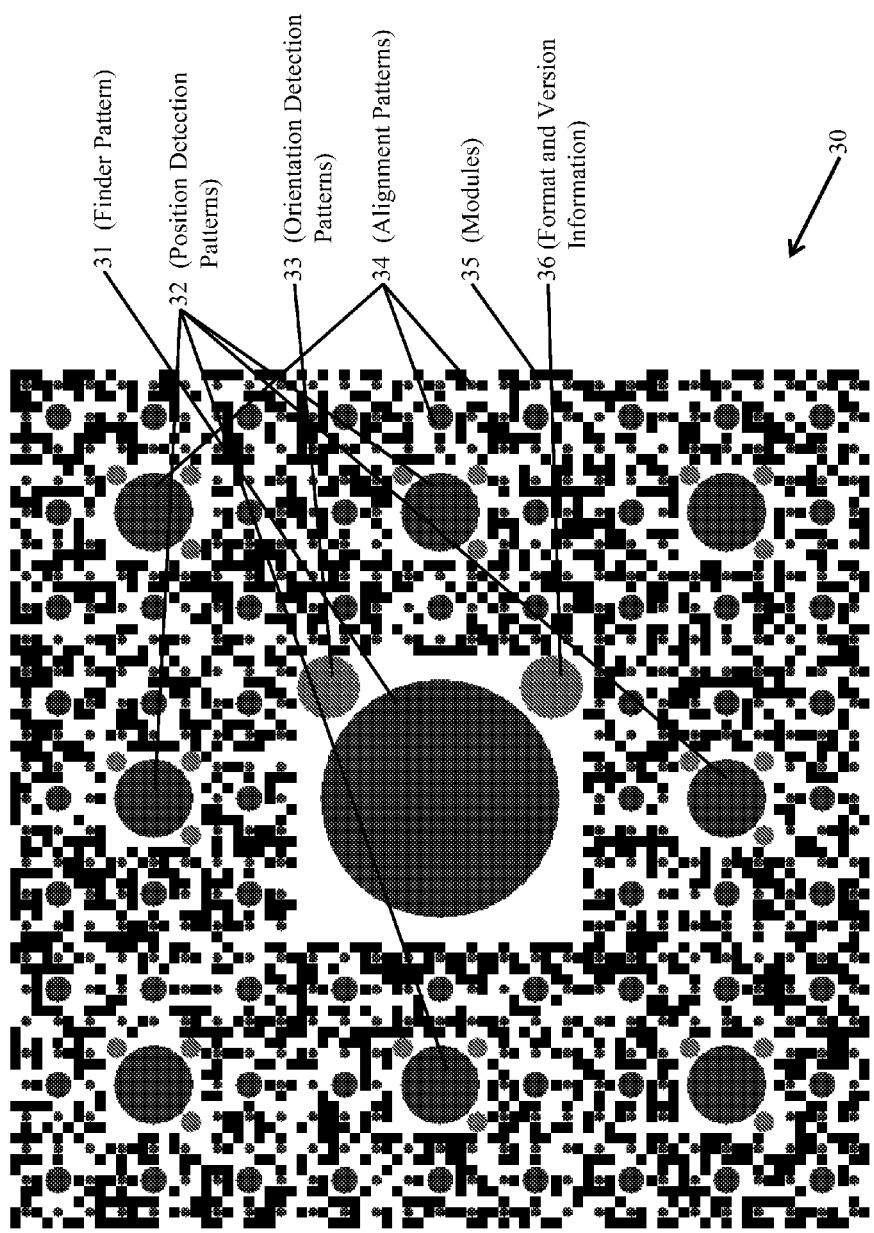

The overall geometric pattern may include a finder pattern located in relation to, or centered on a specific point in the pattern such as the center or corners of the symbol. Each of the schematic diagrams in FIGS. 3-5 is a color coded image generated of a barcode or symbol 30 according to certain embodiments of the present invention. The specific examples in FIGS. 3-5 show the finder pattern 31 at the center of the barcode or symbol 30; however this aspect is not meant to limit the scope certain embodiments of the present invention. The finder pattern 31 can be selected in such a way as to facilitate determination of the position, size and inclination of the barcode or symbol 30.

The overall geometric pattern 30 may include position detection patterns 32 that allow a decoding algorithm to further verify that symbol 30 exists and to detect the orientation of the barcode or symbol 30. Detection of orientation may be facilitated by locating the position of one or more orientation detection patterns 33 provided in a predetermined configuration with barcode or symbol 30. The position detection patterns 32 can be selected and encoded so that similar patterns have a low probability of being encountered in, or in the vicinity of, the barcode, or in pictures where the barcode or symbol 30 is absent. This selection and encoding can also enable rapid identification of a possible barcode in the field of view of the detection device.

The overall geometric pattern may also include alignment patterns 34 that allow the decoding algorithm to further adjust the location of the barcode or symbol 30. In certain embodiments of the invention, a scheme involving color encoding of the finder pattern 31 may be used. The usage of color for finder patterns 31 can further increase the reliability and speed of decoding the barcode or symbol 30.

A color encoding scheme according to certain embodiments of the invention can be implemented as follows. Data encoded in the barcode can typically be considered a set of binary bits where each bit can be 0 or 1. Color encoding can be implemented such that the bits forming the data have a large separation in color space. For example, 0 can be assigned to be a black symbol and 1 can be a white symbol. Other color variations can be employed by, for example, substituting black symbols with a darkly colored symbol (e.g., blue, red or green) and substituting white symbol with a lightly colored symbol (e.g., white, yellow, light blue). In certain embodiments, finder 31, position detection 32 and alignment 34 patterns can use dark colors that are significantly differently from colors used for data symbols. For example, if a barcode or symbol 30 encodes data symbols using black or white, then the finder pattern 31 may be provided in blue and white, position detection patterns 32 may be provided in green and white and alignment pattern 34 may be provided in red and white. An example of this is shown in FIG. 3. According to certain aspects of the invention, the usage of different colors for different types of patterns can increase the overall reliability and speed of decoding the symbol for certain symbologies. However, depending on the properties of the particular symbology, there may not be a significant benefit to using different colors for different types of patterns.

Figure 6:
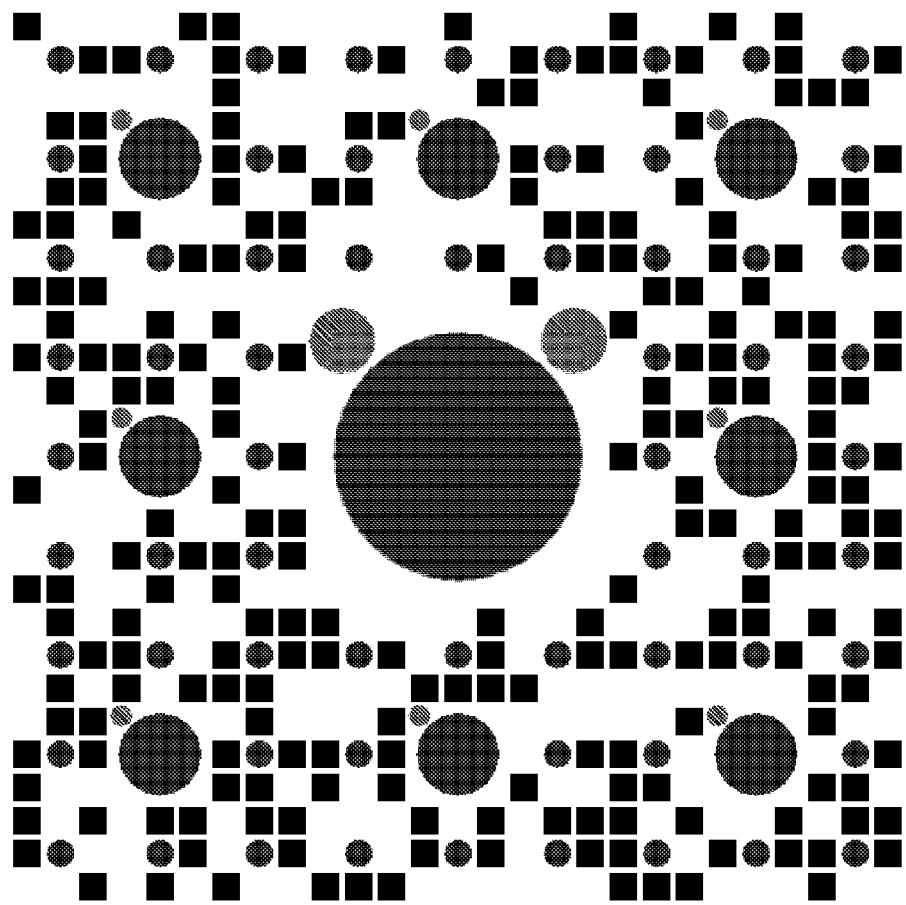
FIG. 6 illustrates a grayscale printout of the color coded image generated according to certain embodiments of the present invention.
Figure 7:
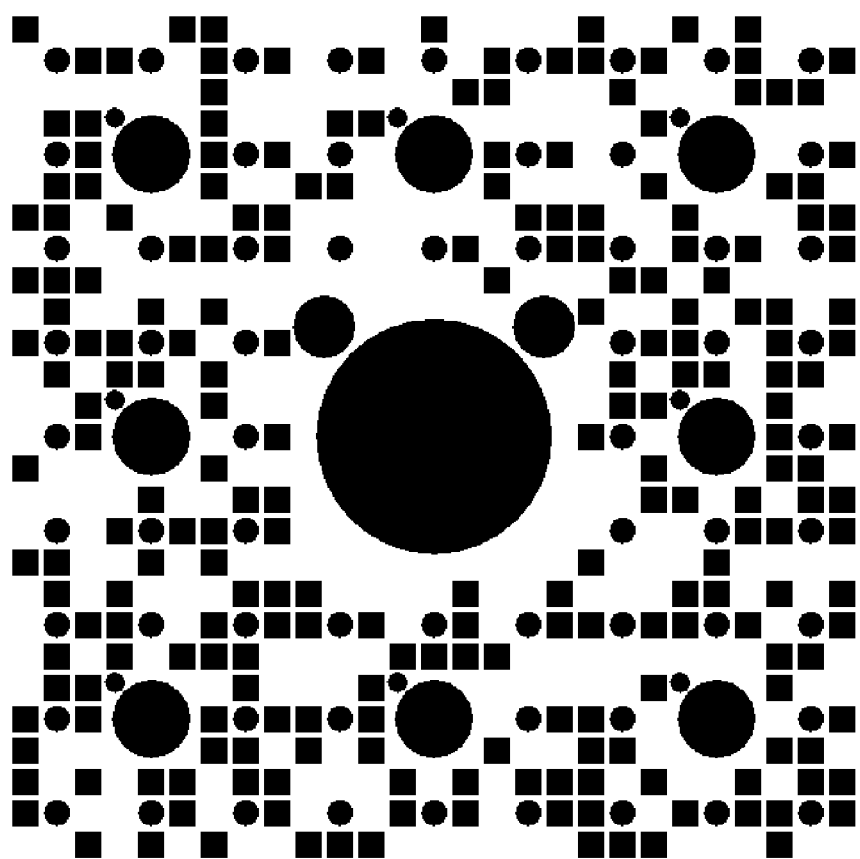
FIG. 7 illustrates a black-and-white printout of the color coded image generated according to certain embodiments of the present invention.
Figure 8:
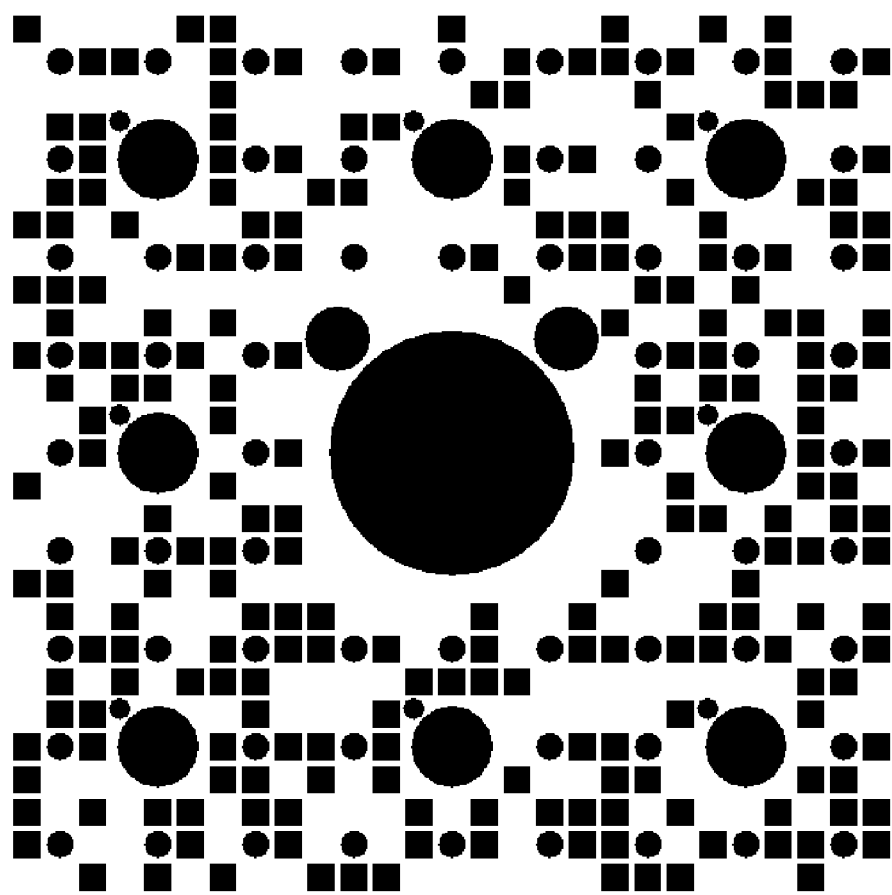
FIG. 8 illustrates a black-and-white dithered printout of the color coded image generated according to certain embodiments of the present invention.

When a multicolored symbol is imaged in gray scale, or printed on a black and white printer, shapes of patterns can still be identified and the barcode can still be decoded. An example of the barcode of FIG. 4 in simulated gray-scale is shown in FIG. 6. An example of the barcode of FIG. 4 in simulated black-and-white printout is shown in FIG. 7. An example of the barcode of FIG. 4 in Floyd-Steinberg dithered black-and-white printout is shown in FIG. 8.

In certain embodiments of the invention, finder patterns 31 are used that can be detected by only inspecting a subset of pixels captured by a scanning device. Rather than inspecting most of the pixels in the captured image, the algorithm described herein can find one or more finder patterns 31 by inspecting a minority of the pixels associated with the captured image. This facilitates increased decoding speed of the associated barcode or symbol 30. In certain embodiments, the number of pixels inspected by the algorithm can be several orders of magnitude less than what can be achieved in other barcode symbologies.

In an image that contains a barcode or symbol 30, the location and the size of the barcode or symbol 30 is usually not a priori known to the scanning device. The decoding algorithm must first identify the location of the barcode or symbol 30. This can be accomplished by first locating the one or more finder patterns 31 in the image. One finder pattern detection algorithm that could be used by symbologies looks for the finder pattern 31 in an iterative fashion starting from one corner of the barcode or symbol 30 and then inspects all pixels until all of the pixels have been searched.

Figure 9:
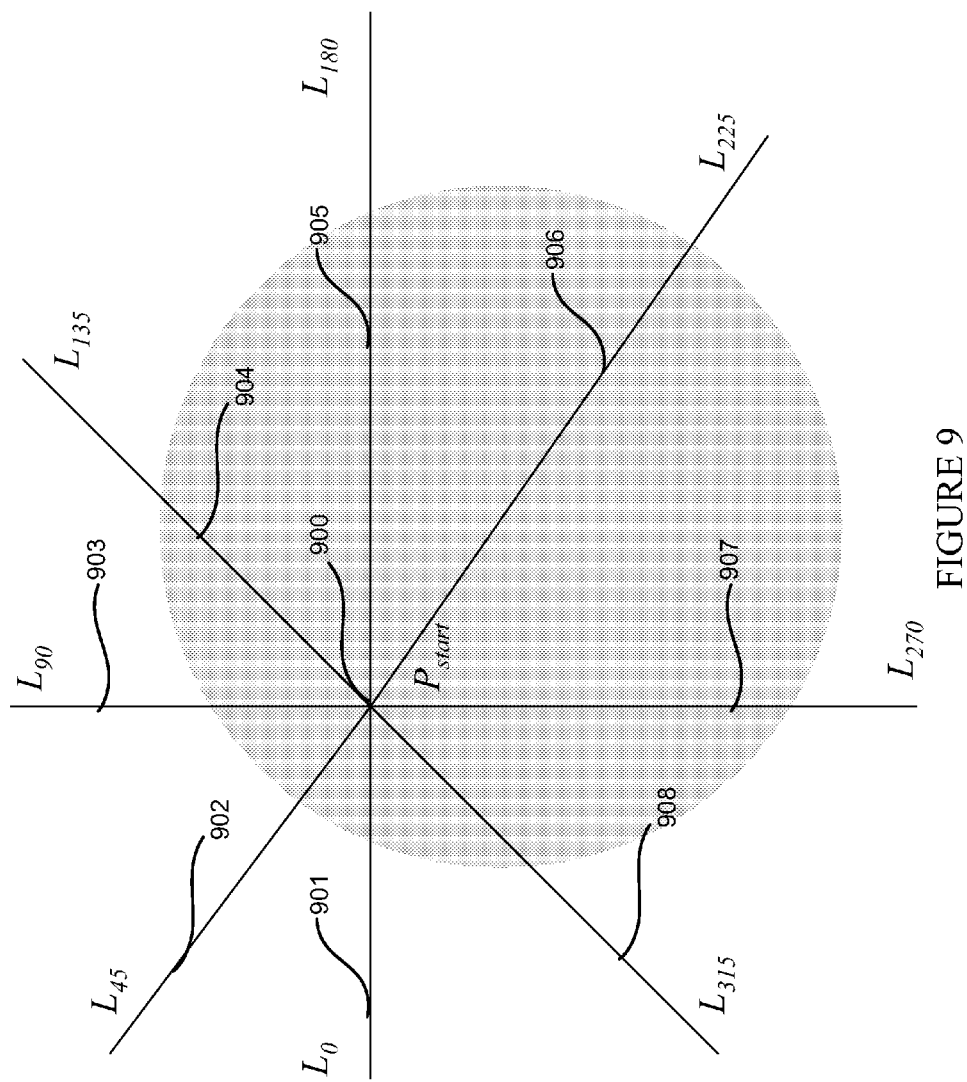
FIG. 9 illustrates the exemplary eight scan lines separated by a 45 degree angle that can be used to detect a circle according to certain embodiments of the present invention.

In certain embodiments of the invention, symbol decoding speed can be increased through the use of geometric shapes and point detection algorithms. The use of geometric shapes allows probabilistic verification of whether a point is inside a specific geometric shape. Certain geometric shapes allow easier detection than the others. For example, a circle can be efficiently detected with probabilistic methods. A circle can be detected with a good probability using a scan line method. With reference to FIG. 9, an algorithm for probabilistic detection may work as follows. Given a starting point $P_{start}$ 900, multiple scan lines 901-908 can be drawn from that starting point 900 with specific angle increments. FIG. 9 illustrates the exemplary eight scan lines 901-908 separated by a 45 degree angle that can be used to detect a circle according to certain embodiments of the present invention. As shown in FIG. 9, the scan lines 901-908 are annotated as $L_i$, each emanating from the starting point $P_{start}$ 900, where i is an angular measurement in degrees. Those skilled in the art will recognize that other angular displacements, number of lines and starting point can also be employed by the present invention.

Figure 10:
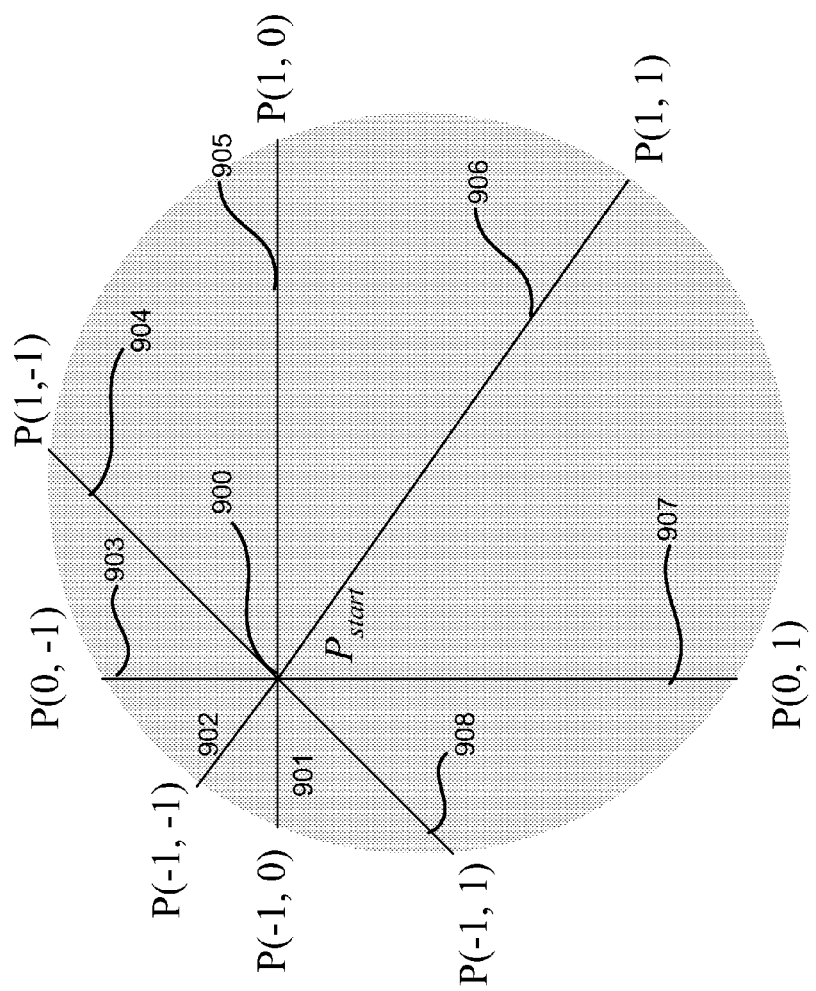
FIG. 10 illustrates the exemplary eight segments formed by constraining the scan lines to the edge of the circle as used in certain embodiments of the present invention.

Starting from $P_{start}$ 900, points along the scan lines can be inspected to see if there is a significant change in the intensity level compared to $P_{start}$ 900. When a significant change in the intensity level is detected, the point at which that intensity change occurred can be assumed to be at the boundary of the shape. Points along all scan lines 901-908 can be examined, but in some embodiments, sufficient information to enable identification of a shape or artifact may be obtained from an examination of fewer than all scan lines 901-908. After inspection of a portion or all scan lines 901-908, further examination of the scan lines 901-908 can be restricted to segments within estimated boundaries of the shape, as shown in FIG. 10 or segments within the estimated boundaries of additional scan lines can be examined.

The segments can then be used to detect the shape (in this example, a circle). The segments in 45 degree angular increments can be defined by the points $[P(-1, -1), P_{start}]$, $[P(-1, 0), P_{start}]$, $[P(-1, 1), P_{start}]$, $[P(0, -1), P_{start}]$, $[P(0, 1), P_{start}]$, $[P(1, -1), P_{start}]$, $[P(1, 0), P_{start}]$ and $[P(1, 1), P_{start}]$. In this example, the center of the circle 900 can be calculated as P(x, y) where x is the horizontal position of P(−1, 0) added to the horizontal position of P(1, 0) divided by 2 and y is the vertical position of P(0, −1) added to the vertical position of P(0, 1) divided by 2. The radius of the circle can be calculated as the average distance from the center point to the positions of these points. Then, probabilistically a circle would exist if the points P(−1, −1), P(−1, 1), P(1, −1) and P(1, 1) would also form a circle with the same center close by to the circle and with a similar radius. A user can define tolerances and other probabilistic measurement representing a level of closeness that permits a shape detection algorithm to determine whether the shape is a circle. In the example, eight scan lines are used, but more scan lines can be used to increase probabilistic accuracy and to decrease probabilistic false positives (e.g., detecting a circle where none exists). However more scan lines can have a negative impact on performance of shape detection. Other shape detection algorithms and methods can be implemented to facilitate detection of other geometric shapes for operation in "noisy" environments, for optimization of performance of computing systems and for other reasons. In the example described, a reference point (center of circle) and a measure of size (radius) of a geometric shape (circle) can describe the geometric shape as presented in the symbol or barcode and can be used to correlate a set of boundary points identified in the image to the geometric shape. However, other shape defining characteristics can be selected as desired to efficiently identify selected geometric shapes.

In certain embodiments of the invention, the above described scan line definition and inspection, and shape detection scheme can be performed iteratively. For example, the scan lines can be individually defined and inspected, followed by probabilistic shape detection. In this way, once the shape is detected to within a user-defined probabilistically significant level, only those scan lines necessary for such detection may be defined and inspected. Further, instead of defining and inspecting scan lines in an angularly-progressive pattern, scan lines may be defined and inspected in a random or other pre-defined pattern (e.g., in a pattern similar to a torque pattern for lug nuts on an automobile wheel). These and other variations to the shape detection scheme are intended to be within the scope of certain embodiments of the present invention.

Certain detection algorithms for certain geometric shapes possess an additional property that allows the detection algorithm to be executed for any starting point in the geometric shape. The scan line method described above is one example of such an algorithm. Continuing with the example presented above, for any starting point in the circle, the scan line scheme can detect the circle and deduce its properties including defining properties such as the center and the radius of the circle. Geometric shapes that can be efficiently detected by such algorithms or are otherwise susceptible to probabilistic detection methods will hereinafter be referred to as "any-point-detection-shapes."

To find an any-point-detection-shape inside a captured image when the location of such any-point-detection-shapes is not known, a search algorithm can be used that randomly picks points in the image and checks if the point is inside the any-point-detection-shape. When the any-point-detection-shape in question occurs only once in an image, the any-point-detection-shape algorithm may terminate after finding the any-point-detection-shape. Furthermore, if multiple such any-point-detection-shapes exist in the image, the any-point-detection-shape algorithm may terminate after detecting one or more of the shapes. Typically, performance of such an algorithm is proportional to the size of the geometric shape. However, if the image does not contain an any-point-detection-shape, the worst case performance of such an algorithm is that it will terminate indicating failure or it may not report success within a maximum allowed time.

Other algorithms can be used to find the location of an any-point-detection-shape in an image. In certain embodiments of the invention, another example of an any-point-detection-shape detection algorithm is based on the assumption that the image contains the largest possible any-point-detection-shape. Accordingly, a maximum limit for size of the any-point-detection-shape can be calculated. Next, a set of possible starting points for the detection algorithm can be determined or calculated using certain properties of the geometric shape and certain characteristics of the detection algorithm. This set of starting points can be selected such that (a) selected locations increase the probabilistic likelihood of detecting the any-point-detection-shape in the image if such shape of the specified size or range of sizes exists, and (b) the number of locations in the set is selectively reduced to facilitate detection of the any-point-detection-shape of maximum size. Typically, one or more of the reduced set of points is used as a starting point by the detection algorithm.

Starting points are typically selected such that a shape of a specified size cannot be placed in the image such that none of the starting points lie within the shape. The set of starting points can be selected to provide a desired pattern of points having a desired separation between the points. Thus, if a shape of the specified size exists, the detection algorithm would be able to detect the geometric shape, and the size of the detected shape can be compared with the estimate. If an any-point-detection-shape of a certain size in the specific locations cannot be found, then the estimated size of the geometric shape can be reduced, and the search can be extended to detect geometric shapes that lie between the previously sought size and shapes of the reduced size. Based on the new constraint on the size of the geometric shape, a new set of possible points can be selected such that if a geometric shape of a size between the specified constraints exists in the image, one of the points will be inside the geometric shape. The detection algorithm can then be executed for the new set of starting points. Similarly, if a shape that satisfies the new size constraints is not be found, the size constraint can be changed (i.e., reduced) again, a new set of starting points can be selected and the search progresses based on the new set of starting points.

Figure 11:
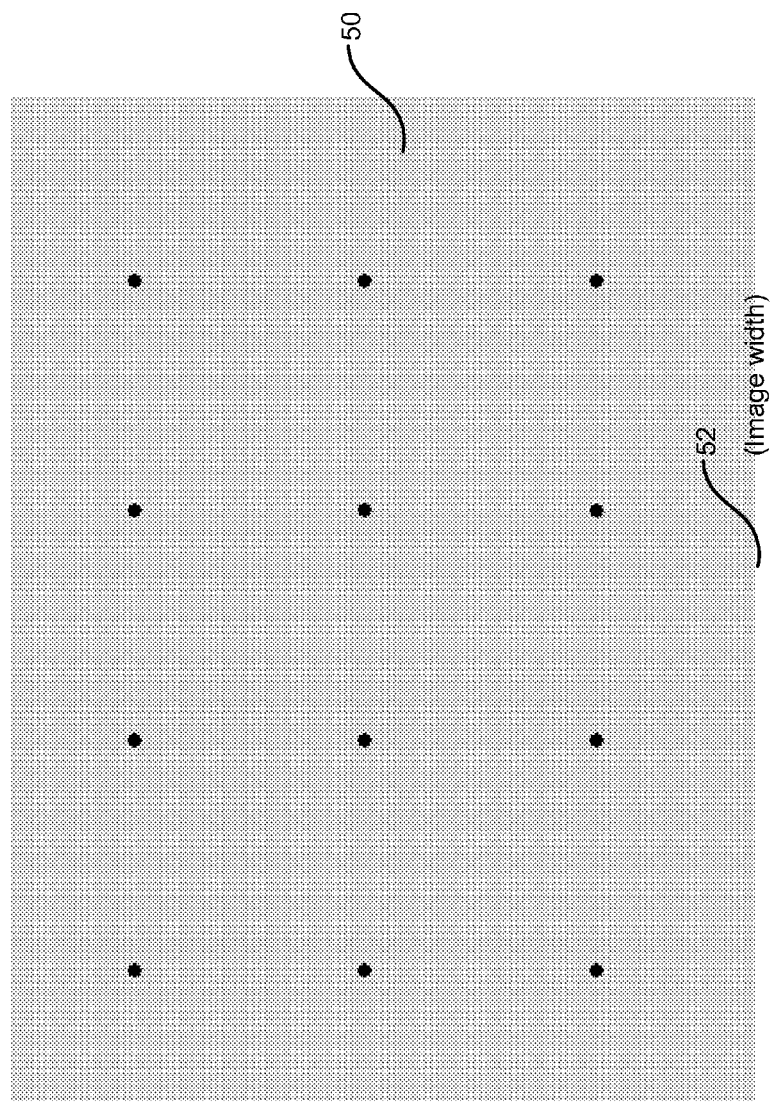
FIG. 11 illustrates the exemplary 12 points that can be used to detect a circle larger than ⅓ of the size of image according to certain embodiments of the present invention.
Figure 12:
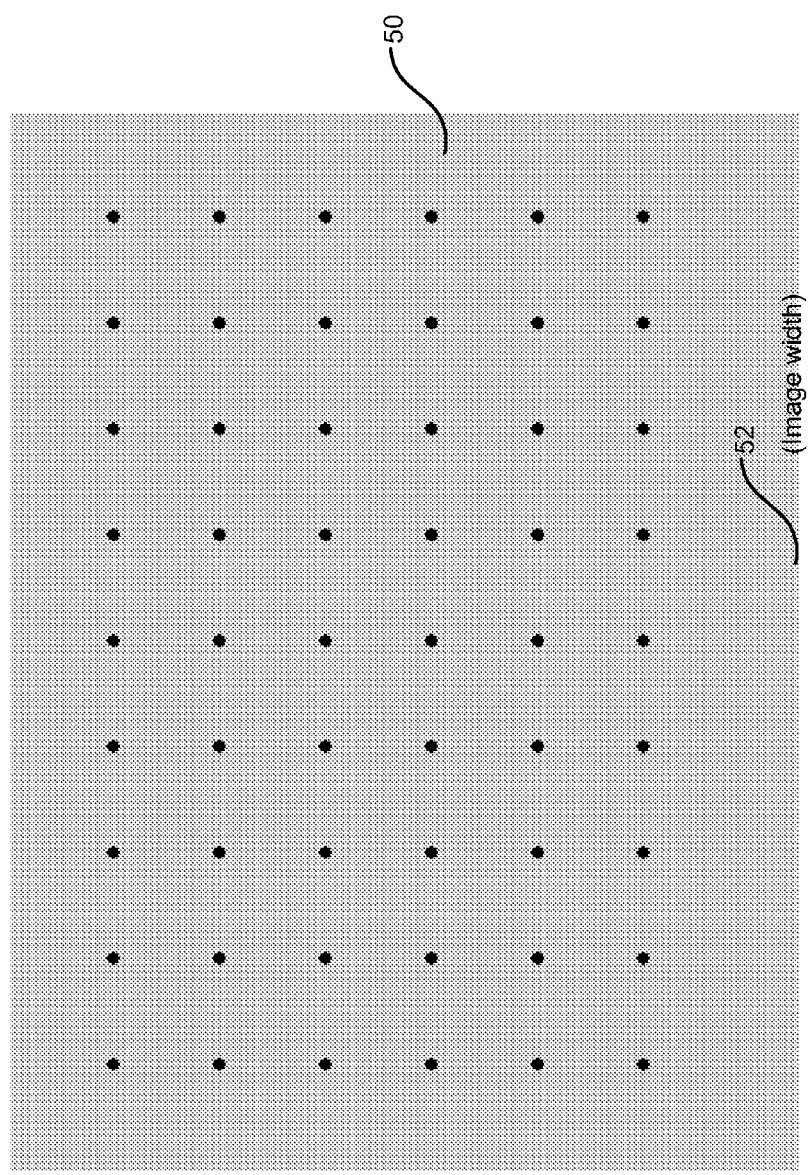
FIG. 12 illustrates the exemplary 48 points that can used to detect a circle larger than ⅙ of the size of image according to certain embodiments of the present invention.
Figure 13:
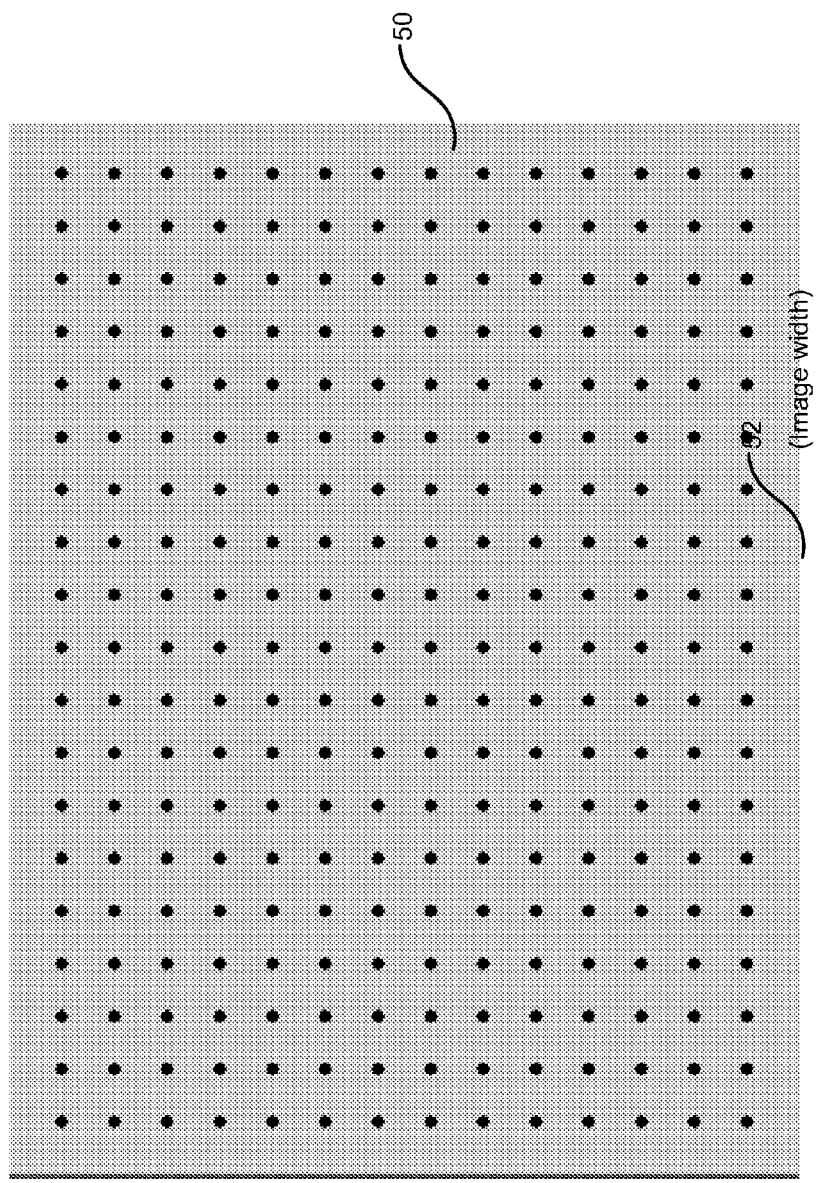
FIG. 13 illustrates the exemplary points that can be used to detect a circle larger than 1/12 of the size of image according to certain embodiments of the present invention.
Figure 14:
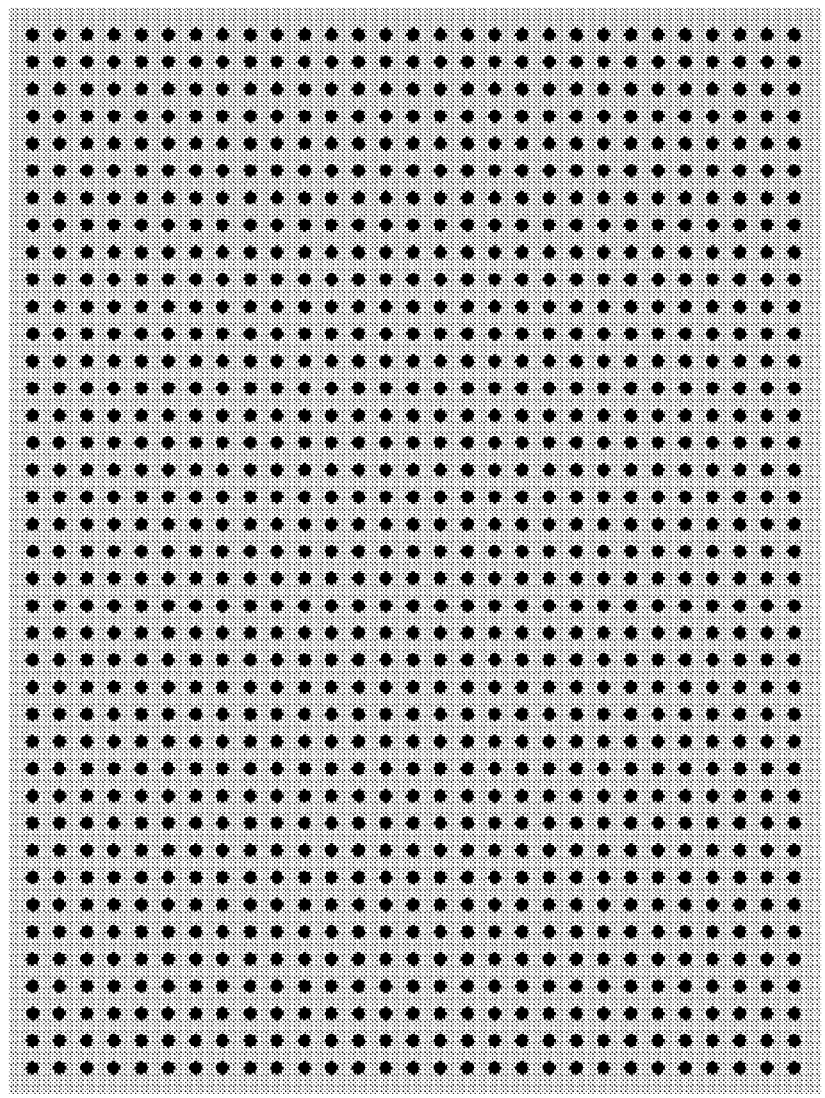
FIG. 14 illustrates the exemplary points that can be used to detect a circle larger than 1/24 of the size of image according to certain embodiments of the present invention.

FIGS. 11-14 depict progressively closer sets of starting points as described in the preceding example. As illustrated, the sets of starting points include a gradually increasing number of points that correspond to a gradually reducing size estimate, or constraint. Again, in the example, the any-point-detection-shape to be detected is assumed to be a circle. In the example of FIG. 11, twelve points are shown within the image area 50 and the points are selected such that a circle having a diameter that is at least one third of the image width 52 can be detected. A circle having a diameter of at least one third of the image width 52 will encompass at least one of the twelve points. FIG. 12 shows a next set of points in the example. For this second iteration, a set of starting points is selected such that at least one of the starting points will be located within the bounds of a circle having a diameter that is greater than or equal to about one sixth of the image width 52. FIG. 13 shows a next iteration in which a set of starting points is selected such that at least one of the starting points will be located within the bounds of a circle having a diameter that is greater than or equal to about one twelfth of the image width 52. FIG. 14 shows a next iteration in which a set of starting points is selected such that at least one of the starting points will be located within the bounds of a circle having a diameter that is greater than or equal to about one twenty-fourth of the image width 52.

In certain embodiments, detection may be suspended after a desired number of iterations. However, detection may continue using one or more finer resolution searches. In the example, the algorithm can terminate after finding an any-point-detection-shape or can terminate with an indication that an any-point-detection-shape of a minimum specified size does not exist. As should now be apparent to those skilled in the art, similar such algorithms can be defined for any other any-point-detection-shape. Likewise, other starting point patterns can be defined for the circle shape or for any other any-point-detection-shape. These and other variations to this algorithm are intended to be within the scope of certain embodiments of the present invention.

Referring again to FIGS. 3-5, if the finder pattern 31 of a barcode or symbol 30 is an any-point-detection-shape, determining the location of the barcode or symbol 30 typically includes finding the location of the finder pattern 31 using one of the algorithms described above. Furthermore, if the barcode or symbol 30 occupies a large portion of the image and if the size of the finder pattern 31 is larger than other shapes in the barcode, the location of the finder pattern 31 can be easily found with few selected started points.

Figure 15:
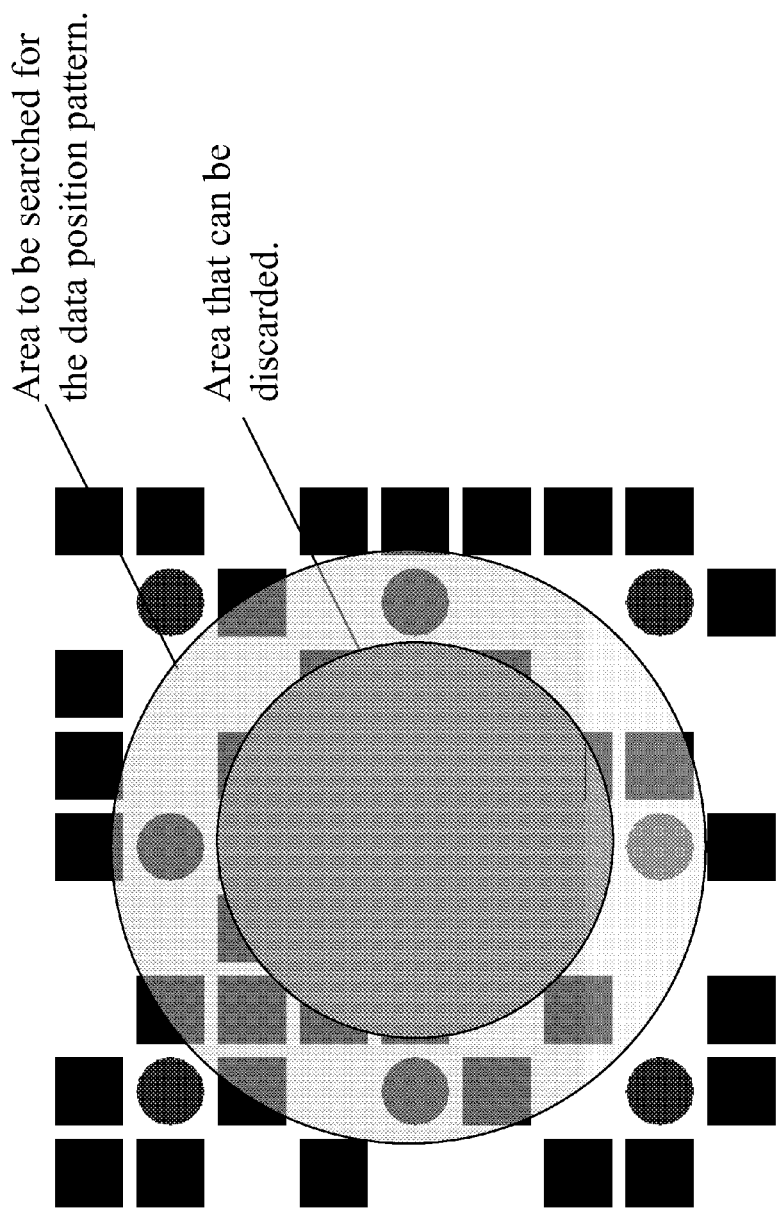
FIG. 15 illustrates an area to be searched and discarded for data position patterns generated according to certain embodiments of the present invention.

In certain embodiments of the invention, using an any-point-detection-shape as a finder pattern facilitates the detection of the barcode, and thus the decoding of that barcode, by first finding the possible positions of the finder pattern and then searching for the position patterns around the finder pattern. This can be achieved by designing barcodes where certain properties of the barcode can be recovered from the size of the any-point-detection-shape, further restricting certain properties of the position detection and alignment patterns. For example, if the finder pattern is a circle, the radius of the circle can restrict where the location patterns can be found. One possible example of such a restricted area is shown in FIG. 15. As shown, the finder pattern is expected to be within the inner circle. Any finder pattern outside this expected area can be discarded, enabling that same shape to be used for alignment and position patterns.

Furthermore, in certain embodiments of the invention, if different shape sizes are used for finder, position and alignment patterns, certain other properties of the shapes can be also restricted. For example, the size of the data position pattern can be calculated by a formula that uses the size of the finder pattern as a variable. In FIG. 15, the size of the data position pattern is approximately ⅓ of the size of the finder pattern. The algorithm defined above used to detect the finder pattern will also avoid classifying smaller patterns as finder patterns, since the algorithm starts the search with the maximum possible size for the finder pattern and then searches for smaller patterns only until the finder pattern is found (assuming one exists at all). Even though there is a possibility of detecting the position, alignment, or other similar patterns (i.e., smaller patterns of the same expected shape) while searching for the finder pattern, the algorithm would reject those as the size criteria would not be satisfied.

Figure 16:
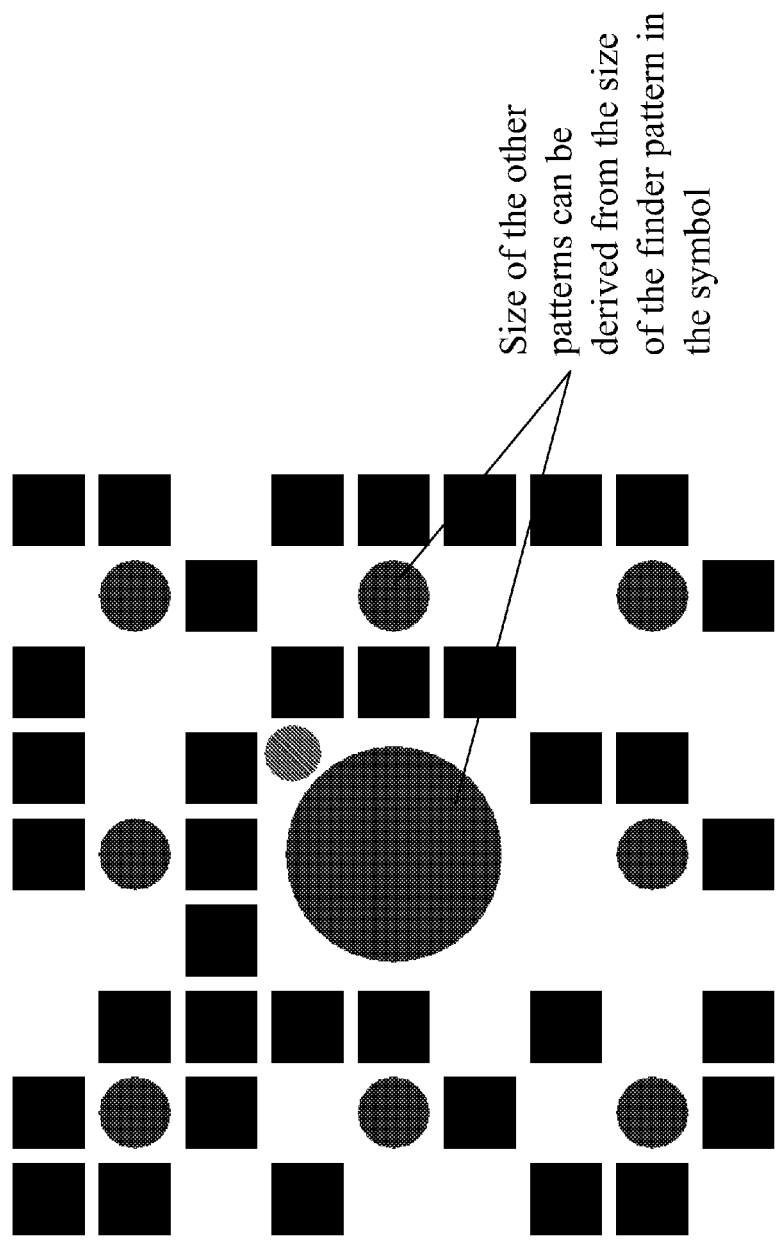
FIG. 16 illustrates an example of an image, where the size of the position and alignment patterns can be derived from other patterns within the image, generated according to certain embodiments of the present invention.

In certain embodiments of the invention, any-point-detection-shapes can be used for other patterns in the barcode as well. For example, if an any-point-detection-shape is used for position detection patterns, the size of the position pattern can be known to be a certain scale of the finder pattern and the location of the position patterns can be restricted to an area in the image, a set of points can be selected such that at least one point falls inside each of the position detection patterns' restricted areas. FIG. 16 illustrates an example of an image, where the size of the position and alignment patterns can be derived from other patterns within the image, generated according to certain embodiments of the present invention. This allows detecting the position detection patterns by running the detection algorithm on very few points, facilitating an increased detection speed.

Figure 17:
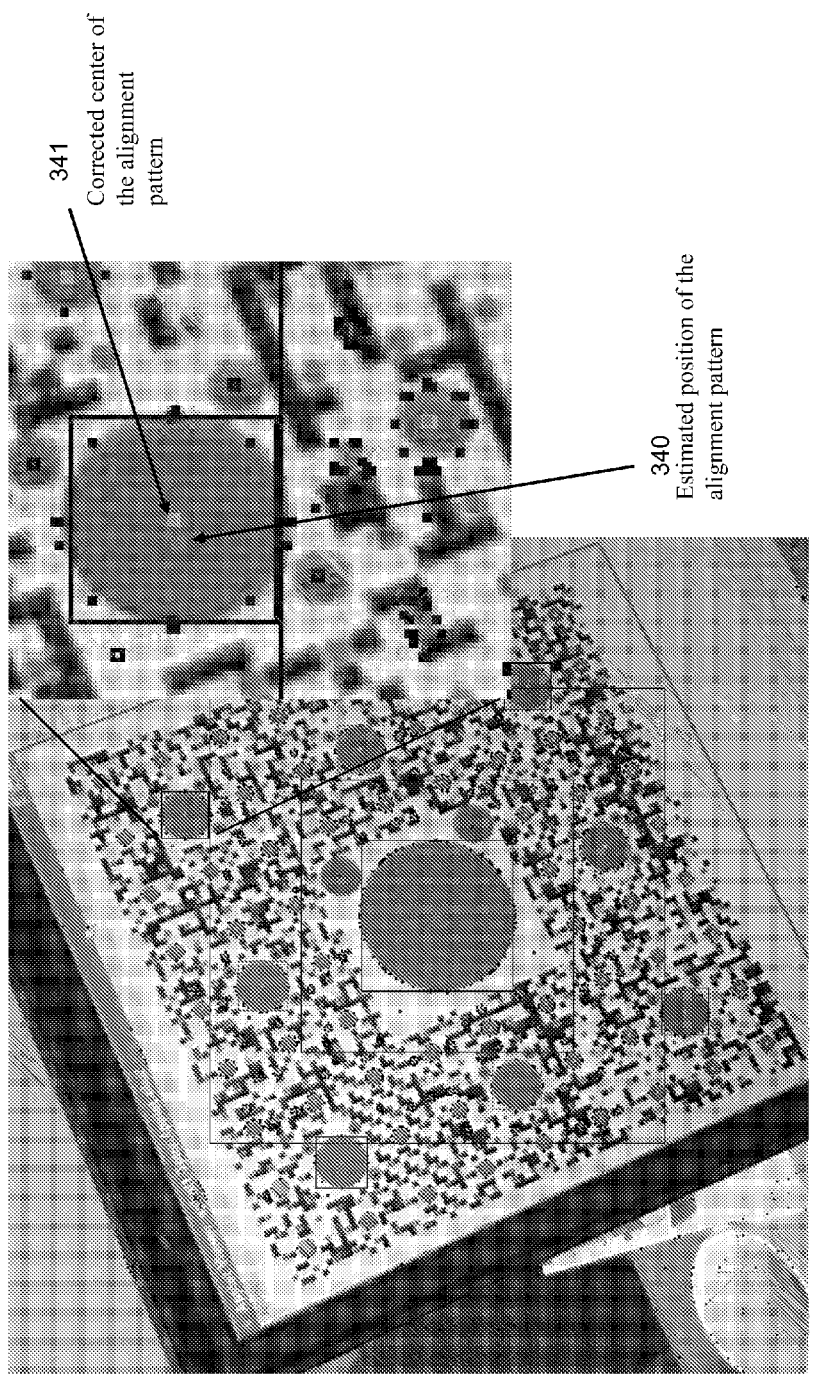
FIG. 17 illustrates exemplary error correction of an image generated according to certain embodiments of the present invention.

In certain embodiments of the invention, this same algorithm can be used for alignment patterns as well. For example, as shown in FIG. 17, perspective distortions may cause an incorrect estimate for the location of the alignment pattern. However because the estimate for the center for the alignment pattern falls within the alignment pattern, it can be corrected through recalculation of the center of the alignment pattern by running the any-point-detection-shape algorithm.

Figure 18:
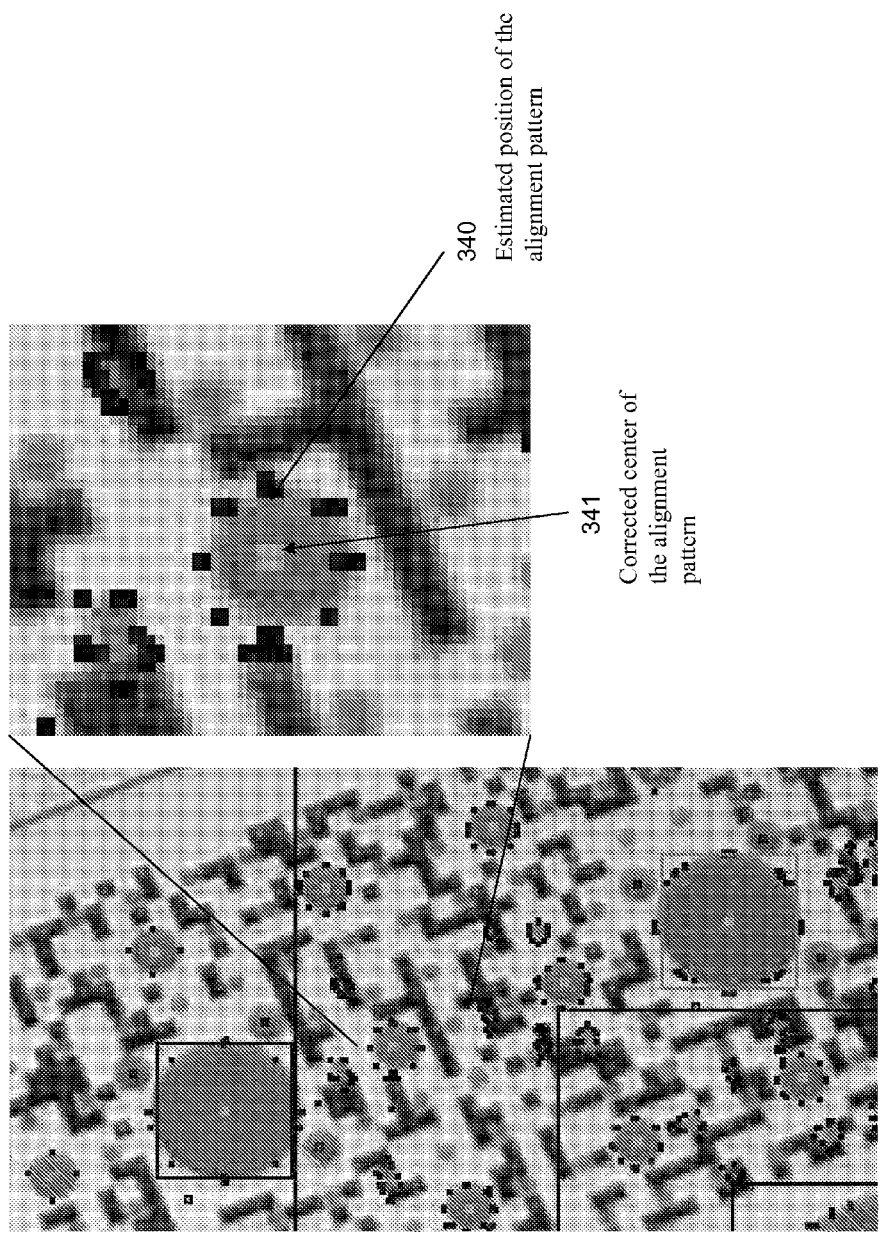
FIG. 18 illustrates exemplary error correction using shape detection for smaller errors of smaller shapes of an image generated according to certain embodiments of the present invention.

In certain embodiments of the invention, large alignment patterns 34 may be used when significant deviation or distortion is expected. As discussed above for larger finder pattern 31, larger alignment patterns 34 can improve alignment reliability. Furthermore, small alignment patterns 34 can be used when smaller corrections are anticipated. Efficiency of the barcode or symbol 30 can be optimized by selectively dispersing large and smaller alignment patterns 34. Improvements in efficiency can typically be obtained without a decrease of decoding reliability. For example, as shown in FIG. 17, a large perspective distortion can be corrected by recalculating the center of the alignment pattern 341. FIG. 18 illustrates an example in which a smaller circle can be used when the possible error in the estimate is lower.

Figure 19:
FIG. 19 illustrates timing patterns in QRCode.
Figure 20:
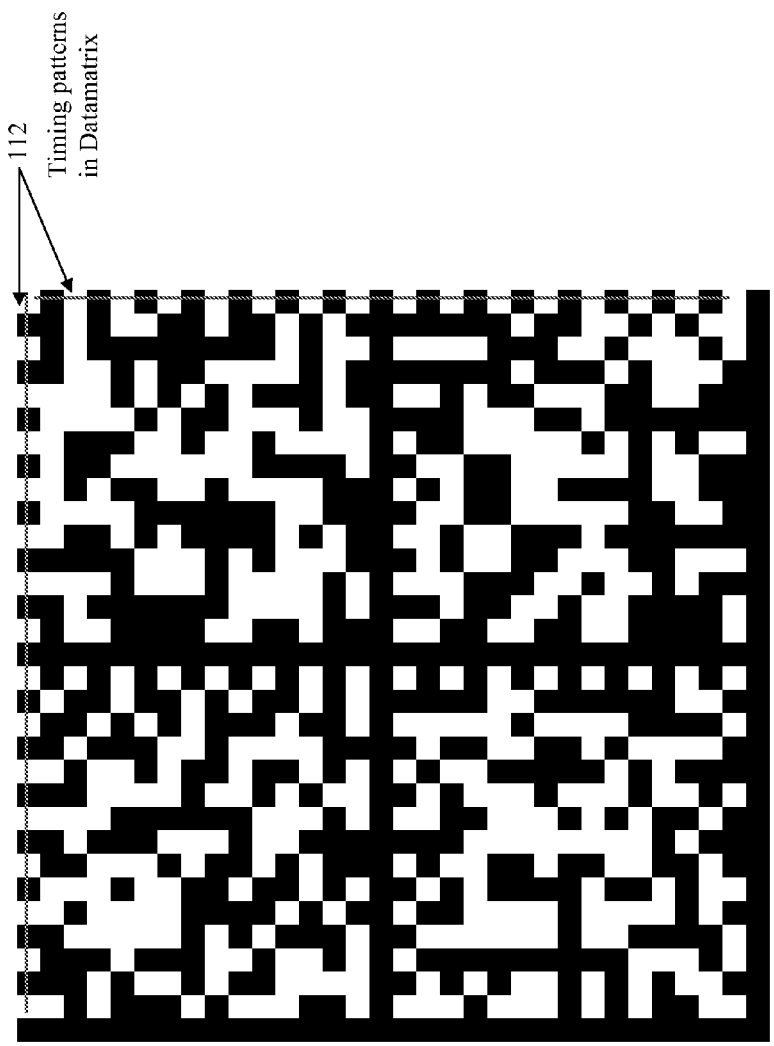
FIG. 20 illustrates timing patterns in DataMatrix[2] code.

In certain embodiments of the invention, the use of differently sized and strategically located any-point-detection-shapes for finder 31, position detection patterns 32 and alignment patterns 34 can create a timing-patternless barcode or symbol 30. Typically, timing-patterns are alternating sequences of dark and light modules that enable module coordinates within the symbol to be determined. Timing patterns 110, 112 in two popular barcode standards are shown in FIGS. 19-20. FIG. 19 shows the timing patterns 110 in the QRCode barcode and FIG. 20 shows the timing patterns 112 in DataMatrix barcode. In QRCode and DataMatrix, the horizontal and vertical timing patterns respectively consist of a one module wide row and/or column of alternating dark and light modules, commencing and ending with a dark module. In QRCode, the horizontal timing pattern runs across row 6 of the symbol between the separators for the upper position detection patterns and the vertical timing pattern similarly runs down column 6 of the symbol between the separators for the left-hand position detection patterns. The timing patterns enable the symbol density and version to be determined and provide datum positions for determining module coordinates.

A barcode that uses differently sized and strategically located any-point-detection-shapes for finder, position and alignment patterns, as in certain embodiments of the present invention, allows correction of estimations for the modules 35 in a recursive fashion without using timing pattern. Typically, a barcode without a timing pattern can use a large number of any-point-detection-shapes as alignment patterns 34 where the modules 35 are dispersed between the alignment patterns 34. The location of the modules 35 can be easily calculated using simple geometry. For example, consider the symbol 30 shown in FIG. 21, if the location of finder pattern 31 and alignment patterns 34 are known, then the location of the modules 35 can be determined by dividing imaginary line segments joining neighboring alignment patterns 34 (or the finder pattern and neighboring alignment patterns) into 3. The one third (⅓) points of these line segments can be used as the location of the modules 35, and the intensity and the color at those points can be then used to decide the value that the module 35 represents. Put another way, in certain embodiments, the centers of no more than two modules can exist equidistantly between two neighboring alignment patterns 34 or between the finder pattern 31 and a neighboring alignment pattern 34. In this example, neighboring patterns refers to two patterns that, if a line were drawn between their centers, no other alignment pattern or finder pattern would be bisected by that line.

FIG. 22 illustrates an exemplary geometric calculation of how module location can be derived according to certain embodiments of the present invention. As shown in FIG. 22, the distance between point A 220 and point C 222 are each located at the ⅔ position on a line connecting their respective neighboring alignment pattern with the finder pattern 31, as measured from the finder pattern 31. Specifically, A 220 is $2L_1/3$ distant from the center of the finder pattern and $L_1/3$ distant from the center of the respective neighboring alignment pattern 34 (likewise for C 222 with respect to $L_2$). As this example illustrates, if the locations of the finder pattern 31 and the alignment patterns 34 have been found, then the location of points A 220 and C222 can easily found. Then, these points can be used as estimates for the center of modules, and the light intensity and color at these points can be used to assign value for the modules. For example, upon processing, the intensity at point A 220 would indicate a light color and the intensity at point C 222 will indicate a dark color.

Similarly in FIG. 22, the distance between point B 224 and point D 226 are each located at a position beyond a line connecting their respective neighboring alignment pattern 34 with the finder pattern 31 at a distance of ⅓ of the length of the connecting line. In particular, B 224 is $L_1/3$ distant and D 226 is $L_2/3$ distant from the center of their respective neighboring alignment patterns 34. The intensity and color at these points can also be used as the value of the module.

Based on the symbology used, it is possible that certain modules may not lie between two patterns. For example, the point F 228 is such a module. If the number of such modules is low, it is possible to leave such modules unencoded without significantly reducing the density of the symbology. It is also possible to use the estimated position of surrounding modules to estimate the location of such modules. For example, the location of the point F 228 can be calculated based on the estimated location of the point G 230 and H 232. If the modules are represented using any-point-detection-shapes, than the estimate for the location of such modules can be enhanced by re-estimating the center of the module using the any-point-detection-shape properties.

Although the present invention has been particularly described with reference to embodiments thereof, it should be readily apparent to those of ordinary skill in the art that various changes, modifications, substitutes and deletions are intended within the form and details thereof, without departing from the spirit and scope of the invention. Accordingly, it will be appreciated that in numerous instances some features of the invention will be employed without a corresponding use of other features. Further, those skilled in the art will understand that variations can be made in the number and arrangement of inventive elements illustrated and described in the above figures. It is intended that the scope of the appended claims include such changes and modifications. The scope of the present invention should, therefore, be determined not with reference to the certain embodiments presented above, but instead should be determined with reference to the pending claims along with their full scope of equivalents.

What is claimed is:

1. A method, comprising:
    detecting, within a two-dimensional barcode comprising a plurality of square modules that collectively encode information, at least one circular finder pattern that is centered or substantially centered at a reference point within the two-dimensional barcode;
    detecting at least one circular alignment pattern that is located within the two-dimensional barcode according to a geometric relationship with the at least one circular finder pattern; and
    determining an alignment of the two-dimensional barcode based on detected locations of the at least one circular finder pattern and the at least one circular alignment pattern.

2. The method of claim 1, wherein the detecting the at least one circular alignment pattern comprises detecting boundary points of the at least one circular alignment pattern on a set of angularly displaced scan lines that intersect at a starting point within the two-dimensional barcode.

3. The method of claim 1, wherein the detecting the at least one circular alignment pattern further comprises:
    selecting a first maximum size of the at least one circular alignment pattern;
    determining, based on the first maximum size, a first set of starting points within the two-dimensional barcode; and
    searching for the at least one circular alignment pattern based on the first set of starting points as parameters.

4. The method of claim 3, further comprising:
    in response to the searching not detecting the at least one circular alignment pattern,
        selecting a second maximum size of the at least one circular alignment pattern, wherein the second maximum size is smaller than the first maximum size;
        determining, based on the second maximum size, a second set of starting points within the two-dimensional barcode; and
        re-searching for the at least one circular alignment pattern based on the second set of starting points as the parameters.

5. The method of claim 1, wherein the detecting the at least one circular alignment pattern comprises detecting the at least one circular alignment pattern based on a color differentiation between the at least one circular alignment pattern and the plurality of square modules.

6. The method of claim 1, further comprising:
    detecting at least one position detection pattern within the two-dimensional barcode; and
    determining a position of the two-dimensional barcode based on a location determined for the at least one position detection pattern.

7. The method of claim 1, further comprising:
    detecting at least one orientation pattern within the two-dimensional barcode; and
    determining an orientation of the two-dimensional barcode based on a location determined for the at least one orientation pattern.

8. The method of claim 1, wherein the detecting the at least one circular alignment pattern comprises searching for the at least one circular alignment pattern within an area of the two-dimensional barcode, wherein the area is selected based on a radius determined for the at least one circular finder pattern.

9. The method of claim 1, further comprising determining a location of a square module of the plurality of square modules based on dividing a distance between two neighboring alignment patterns of the at least one circular alignment pattern.

10. A system, comprising:
    a barcode reader configured to
        scan a symbol comprising a plurality of square modules that collectively encode information,
        detect, within the symbol, at least one circular finder pattern that is centered or substantially centered at a reference point within the symbol and at least one circular alignment pattern that is located within the symbol according to a geometric relationship with the at least one circular finder pattern, and
        determine an alignment of the symbol based on determined locations of the at least one circular finder pattern and the at least one circular alignment pattern.

11. The system of claim 10, wherein the barcode reader is further configured to identify boundary points of the at least one circular alignment pattern on a plurality of angularly displaced scan lines that intersect at a starting point within the symbol.

12. The system of claim 10, wherein the barcode reader is further configured to
    select a first size limit for the at least one circular alignment pattern,
    determine, based on the first size limit, a first plurality of starting points within the symbol, and
    perform a first search for the at least one circular alignment pattern using the first plurality of starting points as first search parameters.

13. The system of claim 12, wherein the barcode reader is further configured to
select a second size limit for the at least one circular alignment pattern in response to a determination that the first search does not detect the at least one circular alignment pattern, wherein the second size limit is smaller than the first size limit,
determine, based on the second size limit, a second plurality of starting points within the symbol, and
perform a second search for the at least one circular alignment pattern using the second plurality of starting points as second search parameters.

14. The system of claim 10, wherein the barcode reader is further configured to detect the at least one circular alignment pattern based in part on a color difference between the at least one circular alignment pattern and the plurality of square modules.

15. The system of claim 10, wherein the barcode reader is further configured to detect at least one position detection pattern within the symbol.

16. The system of claim 10, wherein the barcode reader is further configured to detect at least one orientation pattern within the symbol.

17. A computer-readable storage medium comprising computer-executable instructions that, in response to execution, cause a computing system comprising a processor to perform operations, comprising:
locating, based on a scan of a two-dimensional barcode comprising square modules that collectively encode information, at least one circular finder pattern that is centered or substantially centered at a reference point within the two-dimensional barcode;
locating, based on the scan, at least one circular alignment pattern that is located within the two-dimensional barcode according to a geometric relationship with the at least one circular finder pattern; and
determining an alignment of the two-dimensional barcode based on respective locations of the at least one circular finder pattern and the at least one circular alignment pattern.

18. The computer-readable storage medium of claim 17, wherein the locating the at least one circular alignment pattern comprises locating boundary points of the at least one circular alignment pattern on a set of angularly displaced scan lines that intersect at a starting point defined within the two-dimensional barcode.

19. A system, comprising:
means for detecting, within a symbol that encodes information as a plurality of square modules, at least one circular finder pattern that is centered or substantially centered at a reference point within the two-dimensional barcode and at least one circular alignment pattern that is located within the two-dimensional barcode according to a geometric relationship with the at least one circular finder pattern; and
means for determining an alignment of the symbol based on respective locations of the at least one circular finder pattern and the at least one circular alignment pattern.

20. The system of claim 19, wherein the means for detecting comprises means for detecting a color differentiation between the at least one alignment pattern and the plurality of square modules.

* * * * *

UNITED STATES PATENT AND TRADEMARK OFFICE
CERTIFICATE OF CORRECTION

PATENT NO. : 8,534,567 B2
APPLICATION NO. : 13/735453
DATED : September 17, 2013
INVENTOR(S) : Kiliccote It is certified that error appears in the above-identified patent and that said Letters Patent is hereby corrected as shown below:

In the Specification

In Column 2, Line 7, delete "barcode image," and insert -- barcode image. --, therefor.

Signed and Sealed this
Third Day of June, 2014

Michelle K. Lee
*Deputy Director of the United States Patent and Trademark Office*